United States Patent [19]
Horn

[11] Patent Number: 6,112,886
[45] Date of Patent: Sep. 5, 2000

[54] SNAP-IN RUNNER FOR CONVEYOR CARRIERS

[75] Inventor: George W. Horn, Concord, Mass.

[73] Assignee: Middlesex General Industries, Inc., Woburn, Mass.

[21] Appl. No.: 09/274,416

[22] Filed: Mar. 23, 1999

[51] Int. Cl.[7] .................................................. B65G 29/00
[52] U.S. Cl. .............................. 198/867.11; 198/867.13; 198/803.14
[58] Field of Search .............................. 198/465.1, 465.3, 198/803.2, 867.11, 867.13, 803.14

[56] References Cited

U.S. PATENT DOCUMENTS

| | | | |
|---|---|---|---|
| 3,157,271 | 11/1964 | Peterson | 198/803.14 X |
| 3,240,315 | 3/1966 | Dressler et al. | 198/465.3 X |
| 4,518,076 | 5/1985 | Feisel et al. | 198/867.11 |
| 4,934,515 | 6/1990 | Linden | 198/465.3 X |
| 5,630,499 | 5/1997 | Louden et al. | 198/803.14 X |
| 5,713,455 | 2/1998 | Walser et al. | 198/465.1 |
| 5,927,481 | 7/1999 | Engman et al. | 198/867.13 |

*Primary Examiner*—James R. Bidwell
*Attorney, Agent, or Firm*—Perkins, Smith & Cohen; Jerry Cohen; Harvey Kaye

[57] ABSTRACT

An improvement in a conveyor system having sets of laterally spaced drive and idler wheels, a plurality of at least two different size carriers for containing articles to be worked on and for operating on the same conveyor system; and two runners attached to the sides of each carrier, one runner on each side thereof, each runner having at least one riding surface for supporting the carrier on the wheels, the runners of each carrier being attached and sized and shaped in such manner as to effectuate such support, whereby two different size of carriers can be used at the same time on a single conveyor system. Each carrier having a lower surface, separate from the runners, for handling, storage and stacking of the carriers. The runners are removably attached to the carriers. The runners may be connected to the carriers at an angle with respect to the lower surface of the carriers. The runners may be the same length as the carriers, shorter than the carriers, or longer than the carriers. At least some of the runners may have two different riding surfaces spaced different distances apart, so that the same carrier can be used on different conveyor systems having different lateral wheel spacing. The runners can be selectively removably attached at two different locations on the carrier. The means for removably connecting the runners to the carriers may include snap-in devices.

14 Claims, 5 Drawing Sheets

SNAP-IN RUNNER FOR CONVEYOR CARRIERS

FIELD OF THE INVENTION

The present invention relates generally to the conveying art, and, more particularly, to conveyor carriers for special products being worked on by being transported from work station to work station.

BACKGROUND OF THE INVENTION

The present invention relates to industrial processes where work in progress (work-pieces) is transported from station to station and conveyors are used, particularly where the work-pieces are of high value and/or of a fragile nature. Typically, a batch of work-pieces (the item being operated on at the various stations) are loaded in a carrier and conveyed to and from each station in turn. The carrier types range from open or closed boxes to hermetically sealed pods.

One continuing problem for many factories is that work-pieces needing identical operations often come in significantly different sizes. One prior art solution is to make different size carriers for the different size work-pieces. For example, the hard disk media used in computer disk storage systems come in a wide variety of sizes. The carriers also come in a wide variety of sizes to comply with the media sizes while transporting the media through the manufacturing process. Of necessity the conveyor system must be capable of handling all the different sized carriers and with different drive densities. For example, there are 65 mm, 95 mm, and 130 mm diameter disks needing three different sized carriers. If these different sized disks were to be transported concurrently, three conveyor systems in parallel are used. Such parallel systems entail high costs and wasted space. Alternatively, special conveyors might be specially designed (at high cost) to carry a number of different sized disks, but such systems are not feasible for carrying all different sizes at the same time.

Specific manufactured products of concern include, at least: semiconductor wafers (with and without applied integrated circuit topologies); optical lenses; electromagnetic and electronic arrays; computer disk data storage; flat panel displays; and pharmaceuticals in liquid (bottled or encapsulated) and sold forms.

SUMMARY OF THE INVENTION

It is an object of the present invention to provide a system of different sized carriers, wherein the carriers are suitable for transporting from station to station on a single conveyor system.

It is another object of the present invention to provide a cost effective, clean conveyor system for a wide variety of carrier sizes.

It is a further object of the present invention to provide a system of special carriers that are well suited for irregular work-pieces, e.g., process tools, and the like, but still can be transported smoothly on a single conveyor system.

It is still another object of the present invention to provide a surface for conveying the carriers that is not used for handling, storage and stacking.

The objects of the invention are met by a system of a conveyor assembly which includes at least one size of carrier for containing articles to be worked on, and runners which are removably attached to each carrier, and means for removably connecting the runners to each carrier. Two different size of carriers can be used at the same time by appropriately configuring the runners. Thus, in a conveyor system using rollers, the side-to-side spacing of the rollers remains the same even though the width of the carriers used with the system are different. The runners for the different sized carriers are configured to run along the same sets of rollers and thus different sized carriers may use the same conveyor system.

A few runners, typically two per carrier, used with a common spaced rail system where the rails are shiftable (or a rail system that does not shift). The carriers are equipped with runners, preferentially detachable ones, such as snap on items. Although other attachment mechanisms and configurations may be used. The runners may be made of plastic, metal, wood, ceramic, etc. so that the runners are heat/cold resistant, solvent resistant, etc.

Thus, one aspect of the invention is an improvement in a conveyor system, which includes at least two different size carriers for containing articles to be worked on, runners removably attached to each carrier, and means for removably connecting the runners to each carrier. The different size of carriers operating on the same conveyor system, and the runners for each different size carrier is configured so that both size carriers will operate on the same conveyor system. The conveyor system includes driven and idler wheels upon which the runners are movably supported. The means for removably connecting the runners to the carriers may include snap-in devices. Some parts of the present invention can be similar to parts of the system disclosed in U.S. Pat. Nos. 4,793,262 and 5,452,801 the contents of which are hereby incorporated herein by reference.

Other objects, features and advantages will be apparent from the following detailed description of preferred embodiments thereof taken in conjunction with the accompanying drawings in which:

DETAILED DESCRIPTION OF THE PREFERRED EMBODIMENT

Figure 1:
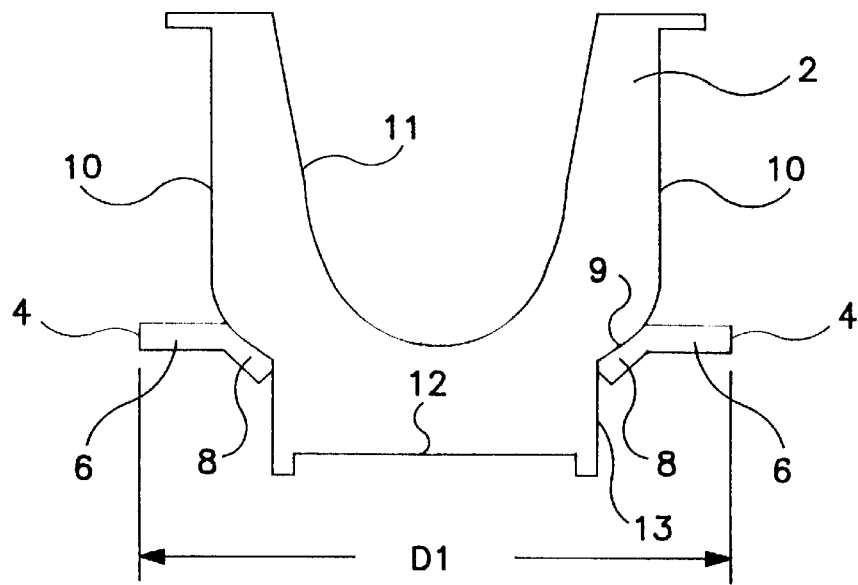
FIG. 1 is an end view of one embodiment of the present invention.

FIG. 1 is an end view of an embodiment comprising a small sized carrier 2. Such a carrier has a lower storing and/or stacking surface 12, generally vertical sides 10, cut-outs 11 in the ends of the carrier, inclined side walls 9 and lower side walls 13. The carriers also have two bent runners, 4, (which can be separate pieces or parts of a single annular piece), one on the left side and a corresponding one on the right side. Each runner is bent into two parts, an attachment section 8 for attaching the runner 4 to the inclined side wall 9 of carrier 2, and a support or riding section 6 which is supported by or rides on wheels as explained below and which thereby support, and drive, the carrier. The distance between the outer edges of the two support sections 6 is indicated as D1.

Figure 3:
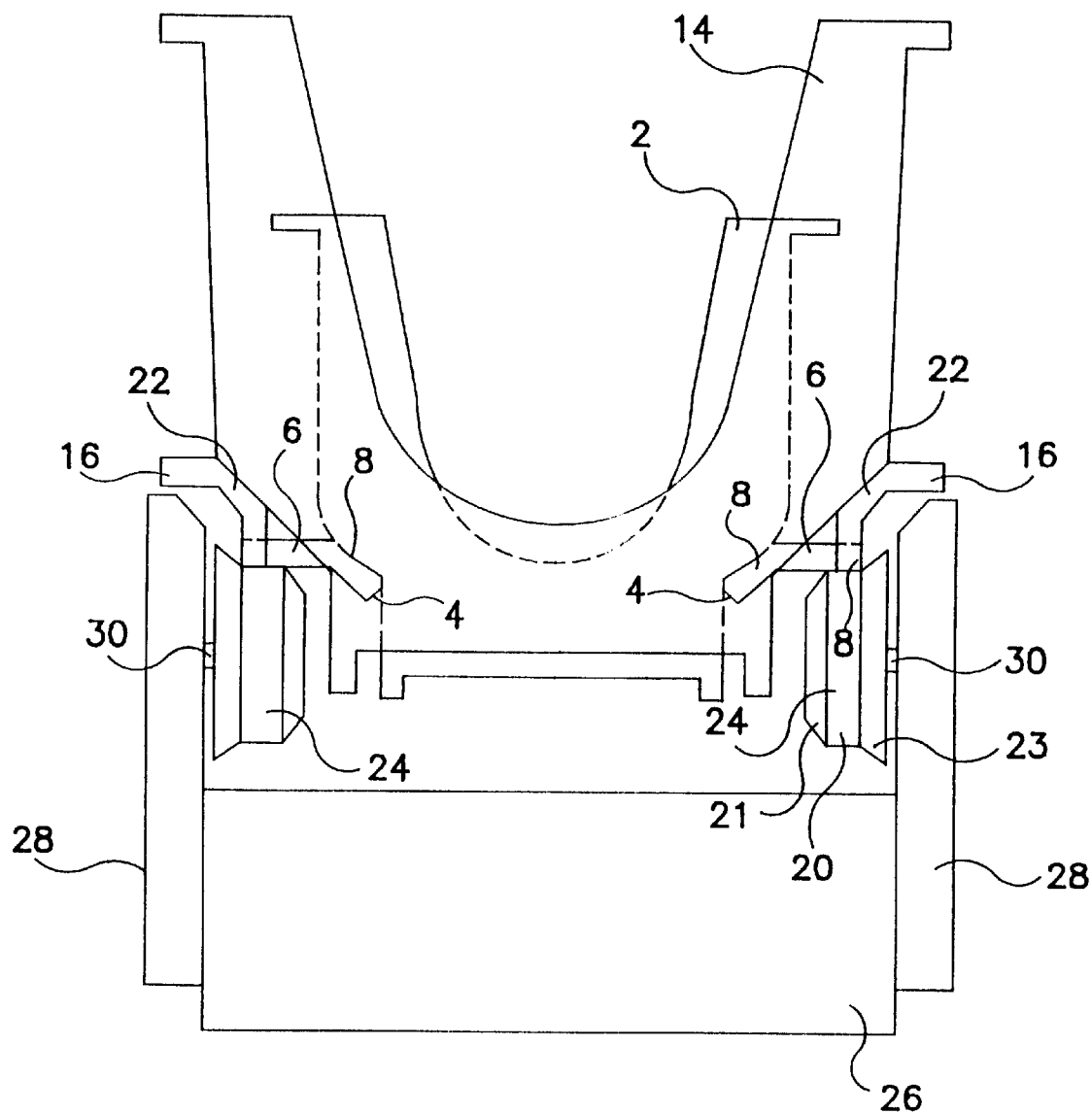
FIG. 3 is an end view showing both carriers of FIGS. 1 and 2 being used on the same conveying system.

The wheels on which the support sections 6 of the runners 4 ride are drive/idler wheels, two of which are shown at 24 in FIG. 3. Some of these are idler wheels and some are drive wheels for providing movement to the carriers by the periodic drive wheels causing movement of the runners 4 by contact with the lower surfaces of support sections 6. The attachment sections 8 of each runner 4 are arranged to accept and be attached to the lower sides on the carrier 2. The attachment of sections 8 to the carrier 2 may be by snaps, belts, adhesives, VELCRO, direct snap-on ring around the carrier, direct heat sealing or brazing/welding, or other such known techniques that may be advantageously used in specific embodiments.

When attached to the carrier 2, the runners 4 provide the means by which the carrier is driven by and on the conveyor wheels 24. Note that the runner driving surfaces 6 are separate from the storing and/or stacking surface 12 of the carrier. An advantage provided by this separate surface is a cleaner drive system since particles attached during stacking, and the like, are not disturbed by the conveyor system. Another advantage of this configuration is that the carrier 2 itself can be of any form to accommodate multiple purposes, such as tool interfacing. These carriers often have notches or protrusions that prohibit smooth conveying. The use of such runners frees the carrier to be designed to comply with virtually any specific process tool requirements while providing means for smooth conveying. With the runners 4 being removable the system is very flexible.

Figure 2:
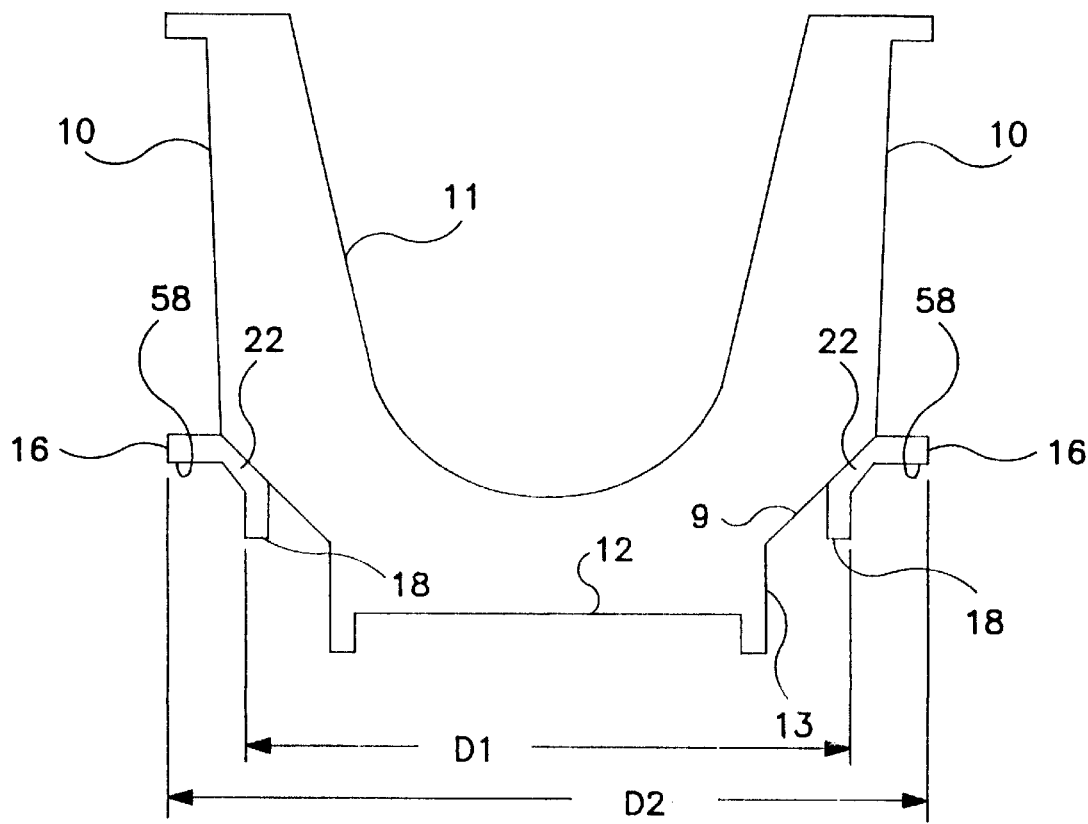
FIG. 2 is an end view of a larger carrier than the one shown in FIG. 1.

FIG. 2 is an end view of a larger carrier 14, constructed in a similar manner as carrier 2 having a lower storing and/or stacking surface 12, generally vertical sides 10, cut-outs 11 in the ends of the carrier, inclined side walls 9 and lower side walls 13. The carriers 14 have runners 16 attached to both inclined sides 9. There is a riding surface 18 on each runner 16 provided for riding on the drive wheels 24 (see FIG. 3). The runners 16 also have attachment surfaces 22 arranged to accept and be attached to the inclined side walls 9 of carrier 14. The distance between the outer surfaces of riding surfaces 18 is shown as D1, similar to the distance between the riding or support surfaces 6 of carriers 2.

FIG. 3 shows an end view of the conveyor arrangement of drive and idler wheels 24. The conveyor includes a bottom 26 and two sides 28. Wheels 24 are attached to the sides 28 via shafts or axles 30, which for the drive wheels are driven shafts, and for the idler wheels are bearing shafts. The rotation of the drive wheels 24 moves the runners; the movement of the runners causes the idler wheels to rotate. The wheels 24 include a cylindrical portion 20, an inclined reduced portion 21 and an inclined expanded portion 23.

The two carriers of FIGS. 1 and 2 are shown in FIG. 3, with the smaller carrier 2 behind the large carrier 14. Carrier 14 rides on the conveyor wheels 24 contacting these wheels on their cylindrical portions 20 with the riding surface 18 of the runners. The distance between the joining portions 20 and 23 of the wheels 24 is D1. The carrier 2 rides on wheels 24 located directly behind the wheels 24 on which the carrier 14 is located, and contacts the drive wheels at the carrier surface 6. The surfaces of the runners that contact the drive wheels for both the larger and the smaller carriers are spaced equally so that both carriers can be conveyed on the same set of wheels 24 forming the conveyor system with no changes.

Thus, the outer extremity of support sections 6 are at the same point as the riding surfaces 18.

Figure 4A:
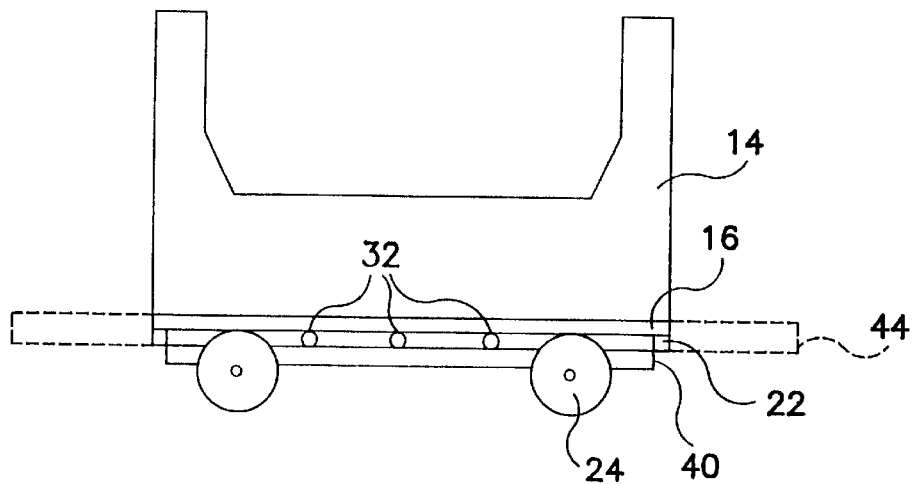
FIG. 4A is a schematic side view of the carrier of FIG. 2.
Figure 5:
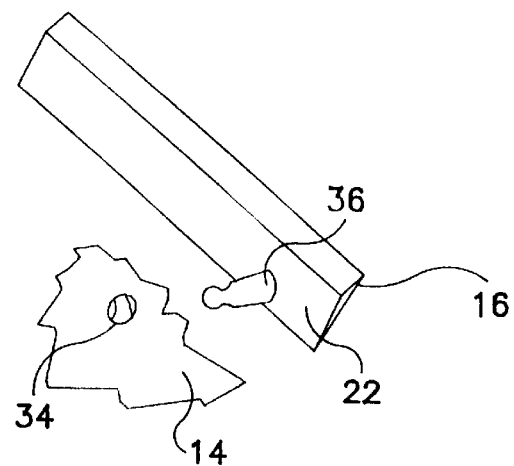
FIG. 5 is a partial isometric view showing the snap-in connection.

FIG. 4A is a representative side view of a carrier 14. The runners 16 are arranged to ride on the conveyor drive wheels 24. The runners are attached by snaps 32 arranged along the mating sides of the runner and the carrier. In this preferred embodiment, FIG. 5 shows the snaps as holes 34 which are built into the carrier 14 and extensions 36 which are built on the runner 16 so that the extensions snap into the holes to attach the runner to the carrier. In other preferred embodiment the attaching of the runners to the carrier can be, as referenced above, by other techniques known in the art.

Figure 4B:
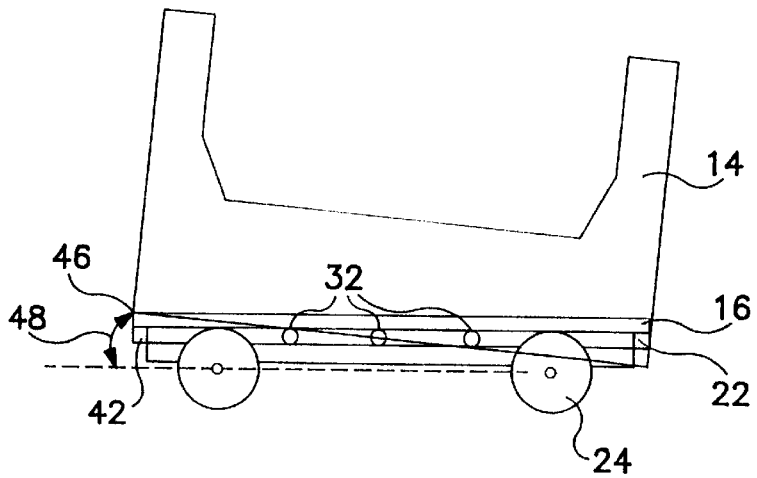
FIG. 4B is a schematic side view of the carrier of FIG. 2 with the runners canted.

Referring to FIG. 4A, the runner may be about as long as the carrier 40, or longer 44 (as shown in dashed lines) to accommodate the wheel size of the conveyor. As shown in FIG. 4B the runner may be shorter than the carrier as shown at 42. This flexibility of runner length is cost effective by eliminating the need to build conveyors with different longitudinal wheel spacing or the need to drive many wheels. If small carriers are used on larger wheels where the carrier cannot be driven, the use of the runners allows that carrier and virtually any carrier to be accommodated on the same conveyor wheels. Flexibility is gained by detaching the runners and replacing the runners with different length runners which allows use on a wide range of conveyor drive wheels.

In another aspect, as shown in FIG. 4B, the runner 16 may be canted to a position 46 at an angle 48 from horizontal. In this arrangement, the work-pieces in the carrier can be made by gravity to rest in a position to minimize any bouncing or rubbing.

Figure 6:
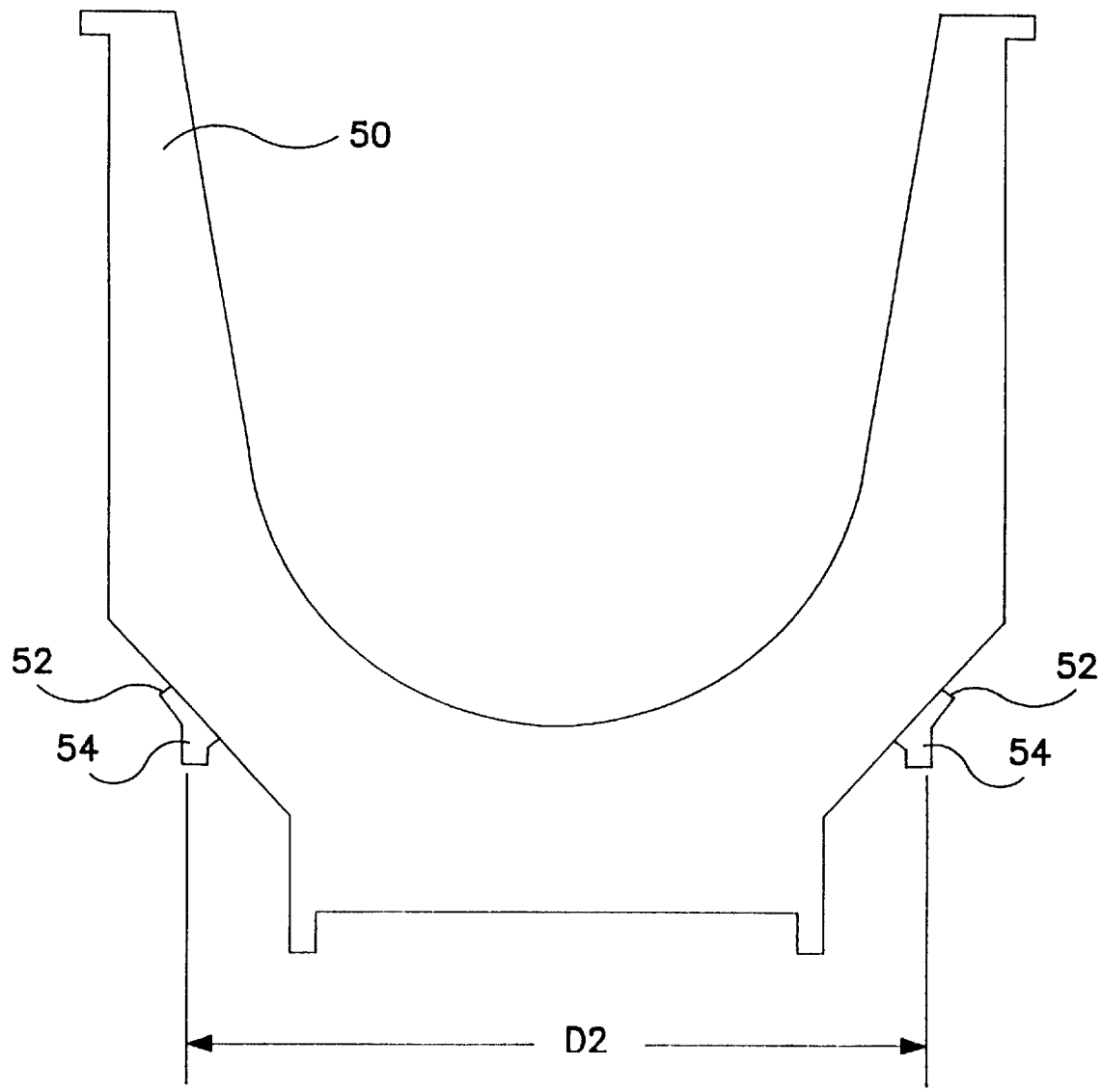
FIG. 6 is an end view showing a carrier larger than the one shown in FIG. 2.
Figure 7:
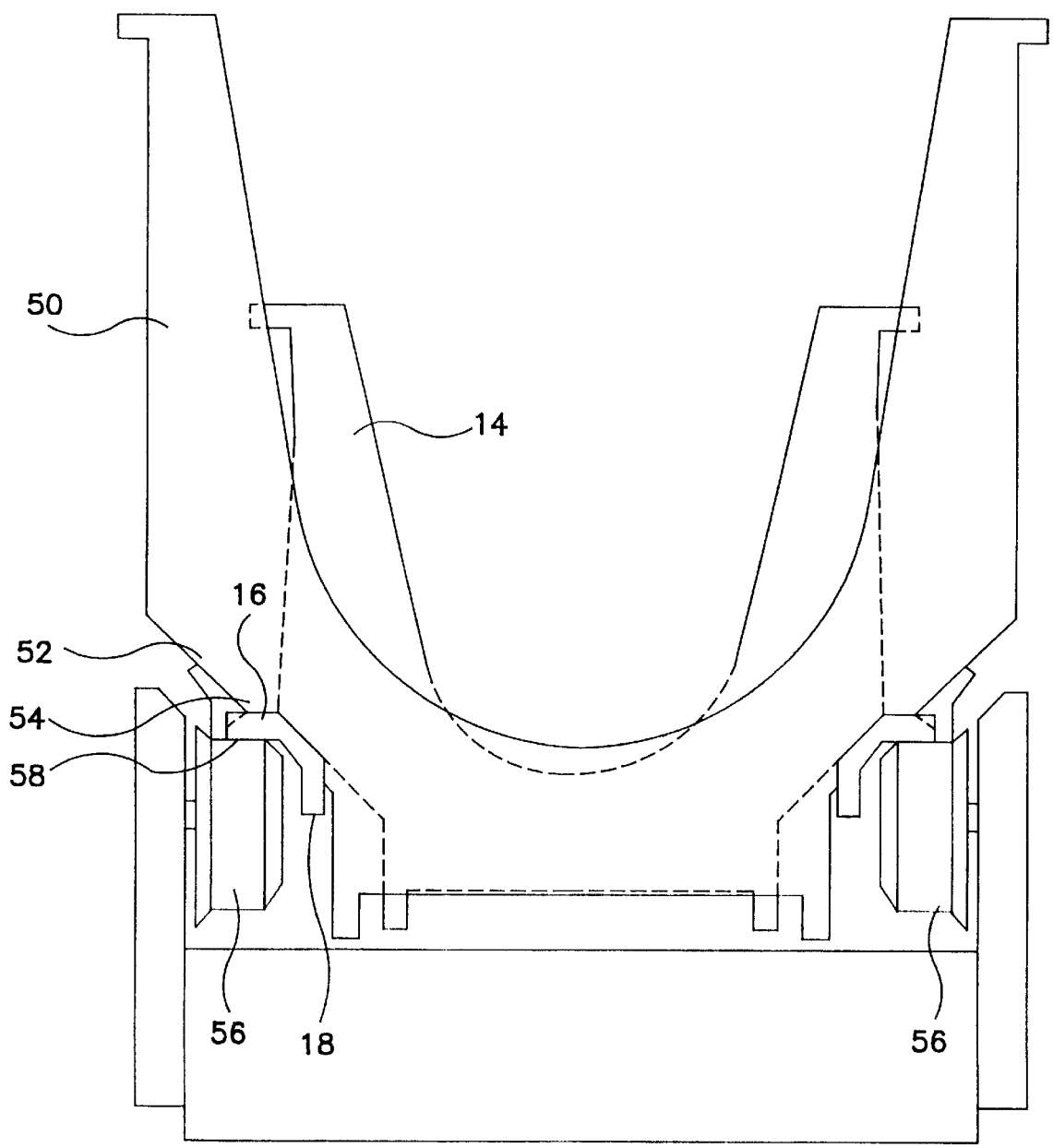
FIG. 7 is an end view showing both carriers of FIGS. 2 and 6 being used on the same conveying system.

FIG. 6 shows a carrier 50 that is so large that it cannot be arranged to rest on and be driven by wheels spaced horizontally apart, such as wheels 24, as shown in FIG. 3. In this case runners 52 are attached to the lower inclined sides of the carrier 50. The runners 50 have riding or support surfaces 54 that are spaced apart a distance D2. They are arranged to rest on and be driven by conveyor drive wheels 56 (of FIG. 7). FIG. 7 shows carrier 50 in front of carrier 14. Carrier 14 runners 16 have surfaces 58 which are spaced a distance D2 to match the spacing of the drive wheels 56, and are also spaced to match the spacing of surfaces 54 of the larger carrier 50. The surfaces 18 of carriers 14, are unused in this instance.

In order to accomplish conveying of the carriers 4 and 14 the wheels 24 are spaced at a given width. This allows a wide range of carrier sizes with detachable runners to be conveyed. However, when even much larger (or much smaller) carriers are to be conveyed the horizontal spacing of the conveyor drive wheels, as for 56, must be changed, in the example shown, widened. With the widened distance between wheels another wide range of carrier widths can be accommodated by use of the runners as described herein.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. In a conveyor system, the improvement comprising
   at least one size carrier for containing articles to be worked on;
   runners removably attached to each carrier; and
   means for removably connecting said runners to each carrier, whereby runners of different size may be exchanged for the runners on the carrier.

2. The improvement as defined in claim 1, wherein there are carriers of at least two different sizes intended to operate on the same conveyor system, the runners for each different size carrier being configured so that both size carriers will operate on the same conveyor system.

3. The improvement as defined in claim 2, wherein the conveyor system includes driven and idler wheels upon which the runners are movably supported.

4. The improvement as defined in claim 2 wherein said means for removably connecting said runners to said carriers include snap-in devices.

5. In a conveyor system having drive and idler wheels, the improvement comprising:

at least two different size carriers for containing articles to be worked on and for operating on the same conveyor system; and runners attached to each carrier for supporting the carriers on the wheels, the runners having riding surfaces for providing such support, the runners of each carrier being attached in such manner as to effectuate such support, whereby two different size of carriers can be used at the same time on a single conveyor system.

6. In a conveyor system having sets of laterally spaced drive and idler wheels, the improvement comprising:

a plurality of at least two different size carriers for containing articles to be worked on and for operating on the same conveyor system; and two runners attached to the sides of each carrier, one runner on each side thereof, each runner having at least one riding surface for supporting the carrier on the wheels, the runners of each carrier being attached and sized and shaped in such manner as to effectuate such support, whereby two different size of carriers can be used at the same time on a single conveyor system.

7. The improvement as defined in claim 6, wherein each carrier has a lower surface, separate from the runners, for handling, storage and stacking of the carriers.

8. The improvement as defined in claim 7, wherein the runners are removably attached to the carriers.

9. The improvement as defined in claim 8, wherein the runners are connected to the carriers at an angle with respect to the lower surface of the carriers.

10. The improvement as defined in claim 8, wherein the runners are the same length as the carriers.

11. The improvement as defined in claim 8, wherein the runners are shorter than the carriers.

12. The improvement as defined in claim 8, wherein the runners are longer than the carriers.

13. The improvement as defined in claim 8, wherein at least some of the runners have two different riding surfaces spaced different distances apart, whereby the same carrier can be used on different conveyor systems having different lateral wheel spacing.

14. The improvement as defined in claim 8, wherein the runners can be selectively removably attached at two different locations on the carrier.

\* \* \* \* \*